(12) United States Patent
McCray et al.

(10) Patent No.: US 10,542,794 B2
(45) Date of Patent: Jan. 28, 2020

(54) BUCKLE WITH SLOTTED-HOLE TANG

(71) Applicant: Fitbit, Inc., San Francisco, CA (US)

(72) Inventors: Dennis Jacob McCray, San Diego, CA (US); Gregoire Ludovic Vincent Vandenbussche, San Francisco, CA (US); Eric John Fairbanks, Lafayette, CA (US); Ming-Sheng Ku, Taipei (TW)

(73) Assignee: Fitbit, Inc., San Francisco, CA (US)

( * ) Notice: Subject to any disclaimer, the term of this patent is extended or adjusted under 35 U.S.C. 154(b) by 229 days.

(21) Appl. No.: 15/627,273

(22) Filed: Jun. 19, 2017

(65) Prior Publication Data

US 2018/0289116 A1 Oct. 11, 2018

Related U.S. Application Data (60) Provisional application No. 62/483,951, filed on Apr. 11, 2017.

(51) Int. Cl.
| | |
|---|---|
| *A44C 5/20* | (2006.01) |
| *A44B 11/22* | (2006.01) |
| *A44B 11/24* | (2006.01) |
| *A44C 5/00* | (2006.01) |
| *G06F 1/16* | (2006.01) |
| *A44C 5/14* | (2006.01) |
| *A44C 5/22* | (2006.01) |

(52) U.S. Cl.
CPC ............ *A44C 5/2057* (2013.01); *A44B 11/22* (2013.01); *A44B 11/24* (2013.01); *A44C 5/0007* (2013.01); *A44C 5/0053* (2013.01); *A44C 5/0084* (2013.01); *A44C 5/14* (2013.01); *A44C 5/22* (2013.01); *G06F 1/163* (2013.01)

(58) Field of Classification Search
CPC ... A44C 5/2057; A44C 5/2017; A44C 5/0084; A44C 5/22; A44C 5/14; A44C 5/0007; A44C 5/0053; A44C 5/2071; A44C 5/2042; A44B 11/24; A44B 11/22; A44B 11/02; G06F 1/163; G04G 21/025; G04G 17/02

See application file for complete search history.

(56) References Cited

U.S. PATENT DOCUMENTS

| | | | | |
|---|---|---|---|---|
| 2,604,682 | A * | 7/1952 | Gardner | A44B 11/24 24/180 |
| 4,470,174 | A * | 9/1984 | Rhea | A41F 9/002 24/16 PB |
| 9,961,969 | B2 * | 5/2018 | Kawabata | A44C 5/20 |
| D821,247 | S * | 6/2018 | Lean | D11/3 |
| D826,406 | S * | 8/2018 | Paschke | D24/167 |
| 2018/0294554 | A1* | 10/2018 | Xu | A61B 5/6831 |

* cited by examiner

*Primary Examiner* — Robert Sandy
*Assistant Examiner* — Louis A Mercado
(74) *Attorney, Agent, or Firm* — Weaver Austin Villeneuve & Sampson LLP (57) ABSTRACT

A wristband with straps having a fixed-position keeper and a tang buckle with an elongate-hole tang is provided. The elongate hole may permit the tang to slide for a limited distance along the length of the buckle strap, thereby accommodating different wrist sizes and shapes while reducing the possibility of "bridging" or "tang lift" in the band.

20 Claims, 7 Drawing Sheets

BUCKLE WITH SLOTTED-HOLE TANG

CROSS-REFERENCE TO RELATED APPLICATION

This application claims benefit of priority under 35 U.S.C. § 119(e) to U.S. Provisional Patent Application No. 62/483,951, filed Apr. 11, 2017, and titled "WATCH BAND LATCH AND BUCKLE," which is hereby incorporated by reference herein in its entirety.

TECHNICAL FIELD

The present disclosure relates to wearable devices. In particular, wearable devices that include a strap, such as a wrist strap, for wearing the device on a person's forearm or wrist, e.g., wristwatches, wrist-wearable fitness trackers, smartwatches, bracelets, etc.

BACKGROUND

Wrist-wearable accessories, e.g., watches, fitness trackers, bracelets, etc., typically include a band that includes an adjustment mechanism to allow the size of the band, when closed into a loop, to be changed to fit a number of different wrist sizes. Such bands are either generally contiguous, e.g., two straps joined together by a "double-locking folderover clasp" that bridges between the two straps and that does not need to be removed in order for the wearer to remove the band, or are discontiguous, e.g., two straps, one of which has a buckle of some sort and the other strap that has features allowing it to interface with the buckle—the two straps are typically disconnected from one another in order for the wearer to remove the band.

For discontiguous bands, one common fastening system is a tang buckle, which has the general appearance of a belt buckle with a frame (also referred to as a "loop") and tang (also sometimes referred to as a "pin" or "prong") that are attached to the end of one of the straps—referred to herein as the "buckle strap"—and usually configured such that the tang can rotate relative to the frame but cannot rotate past the frame. The frame is sized to have an opening through which the other strap—referred to herein as the "adjustment strap"—can be passed, and the tang may engage with one or more holes on the other strap and prevent the other strap from being pulled back out of the frame. The "free" end of the adjustment strap is typically secured with a "keeper," which is usually a rectangular-shaped loop that has an opening that is as wide as the straps are and as tall as the stacked height of the two straps; the keeper is usually mounted on the buckle strap and the free end of the adjustment strap may be inserted into the keeper and the keeper slid to the end of the adjustment strap to keep it from protruding out from the fastened band (thus the name "keeper").

SUMMARY

Details of one or more implementations of the subject matter described in this specification are set forth in the accompanying drawings and the description below. Other features, aspects, and advantages will become apparent from the description, the drawings, and the claims.

In some implementations, an apparatus may be provided that includes a first strap, the first strap having a plurality of keeper holes arranged at spaced-apart locations from one another along a long axis of the first strap, and a buckle, the buckle located at one end of the first strap. The buckle may include a tang pivot bar, a tang, and a frame. The tang may have an elongate hole through which the tang pivot bar passes, and the elongate hole may allow the tang to rotate about a center axis of the tang pivot bar and to translate relative to the tang pivot bar by at least a first distance along a direction perpendicular to the center axis.

In some additional implementations, the elongate hole may be an obround hole and the tang pivot bar may have a round cross section in at least a region that passes through the tang.

In some further implementations, the apparatus may further include a second strap, the second strap having a plurality of adjustment holes arranged at spaced-apart locations from one another along a long axis of the second strap.

In some implementations of the apparatus, the tang may include a first segment that extends away from the elongate hole along a first axis aligned with a long axis of the elongate hole, a second segment that extends along a second axis that intersects the first axis at an angle of between 70° and 90°, and a third segment that extends along a third axis that intersects the second axis at an angle of between 70° and 90°.

In some implementations of the apparatus, the apparatus may be described by parameters such as: t=thickness of the tang where the tang passes through one of the adjustment holes on the second strap when the second strap is connected with the first strap, w=width of the adjustment hole in a direction aligned with a long axis of the second strap, p=pitch distance between adjacent adjustment holes, r is a value between 0.4 and 0.5, and the first distance=t−w+rp.

In some implementations of the apparatus, the adjustment holes may have a pitch spacing of between 0.2 inches and 0.25 inches.

In some implementations of the apparatus, the adjustment holes may have a pitch spacing that is variable.

In some implementations of the apparatus, the adjustment holes may have a pitch spacing that is constant.

In some such implementations, the apparatus may further include a peg component that extends from a side of the second strap that faces towards the first strap when the second strap and the first strap are connected, and the peg component may be configured to engage with one of the keeper holes on the first strap.

In some further such implementations, the peg component may include a body portion with a cross-section that is substantially the same as the cross-sections of the keeper holes and a head portion that has a cross-section larger than the cross-sections of the keeper holes.

In some such implementations, the first strap may include a flexible polymer outer skin and a flexible polymer spine embedded within the outer skin, the spine may include the keeper holes, and the outer skin may have openings with cross-sections larger than the cross-sections of the head portion at each keeper hole such that the head portion is at least partially recessed into the first strap when the peg component is engaged with the spine.

In some implementations of the apparatus, the first strap may be configured to permit the tang to rotate about the center axis of the tang pivot bar by a first amount when the tang is translated in the direction perpendicular to the center axis such that the tang is extended away from the keeper holes by the first distance.

In some further such implementations, the first strap may include a guide surface that is nominally parallel to the long axis of the first strap, and the guide surface may have a dimension along a direction parallel to the long axis of the first strap that is at least twice the first distance.

In some further such implementations of the apparatus, the guide surface may be configured to permit the tang to rotate about the center axis of the tang pivot bar by a second amount when the tang is translated in the direction perpendicular to the center axis such that the tang is translated towards the keeper holes by the first distance, and the second amount may be less than the first amount.

In some implementations of the apparatus, the portion of the tang in between the tang pivot bar and the guide surface may have a thickness that is between 80% and 100% of the minimum distance between the tang pivot bar and the guide surface in the region where the tang engages with the tang pivot bar.

In some implementations of the apparatus, the frame may have a recess and: the recess may be configured to receive the tang when the tang is rotated around the center axis of the tang pivot bar and into contact with the frame, the recess may be sized wider than the tang, the recess may have a tang contact surface that contacts the tang when the tang and the frame are in contact with each other, and the tang contact surface may be longer than the first distance in a direction aligned with the long axis of the first strap when the frame is oriented such that the tang contact surface is parallel to the long axis of the first strap.

In some implementations of the apparatus, the keeper holes may have a pitch spacing of between 0.2 inches and 0.25 inches.

In some implementations, an apparatus may be provided that includes strap means and buckle means connected with the strap means. The buckle means may include a slidable and rotatable tang means and a frame. The tang means may be rotatable relative to the frame about a center axis and translatable by at least a first distance relative to the frame along a direction perpendicular to the center axis.

In some implementations, a method for reducing bridging in a wearable device strap may be provided. The method may include providing a first strap, the first strap having a plurality of keeper holes arranged at spaced-apart locations from one another along a long axis of the first strap and a buckle. The buckle may be located at one end of the first strap and may include a tang pivot bar, a tang, and a frame. The tang may have an elongate hole through which the tang pivot bar passes, and the elongate hole may allow the tang to rotate about a center axis of the tang pivot bar and to translate relative to the tang pivot bar by at least a first distance along a direction perpendicular to the center axis.

In some implementations of the method, the method may further include providing a second strap, the second strap having a plurality of adjustment holes arranged at spaced-apart locations from one another along a long axis of the second strap, inserting a first end of the second strap through the buckle, inserting the tang through one of the adjustment holes, connecting the first end of the second strap with one of the keeper holes in the first strap, and sliding the tang relative to the tang pivot bar until the tang rests against the frame and the second strap lies flush against the first strap.

These and other implementations are described in further detail with reference to the Figures and the detailed description below.

BRIEF DESCRIPTION OF THE DRAWINGS

The present disclosure is illustrated by way of example, and not limitation, in the figures of the accompanying drawings, in which like reference numerals indicate similar elements unless otherwise indicated.

FIGS. 3 through 9 and FIG. 12 are drawn to-scale within each Figure, although not necessarily to the same scale from Figure to Figure.

DETAILED DESCRIPTION

Importantly, the concepts discussed herein are not limited to any single aspect or implementation discussed herein, nor to any combinations and/or permutations of such aspects and/or implementations. Moreover, each of the aspects of the present invention, and/or implementations thereof, may be employed alone or in combination with one or more of the other aspects and/or implementations thereof. For the sake of brevity, many of those permutations and combinations will not be discussed and/or illustrated separately herein.

The present inventors conceived of a new type of tang buckle, also referred to herein simply as a "buckle," that accommodates the use of a fixed-position keeper (although it could potentially be used with sliding keepers as well). A fixed-position keeper is a keeper that is not free to slide relative to the end of the adjustment strap. For example, a fixed-position keeper may take the form of a peg component that is inserted through a hole at the end of the adjustment strap and that protrudes through the adjustment strap such that it may also be inserted into a hole on the buckle strap, thereby pinning the free end of the adjustment strap to the buckle strap.

The use of a fixed-position keeper may allow for a more streamlined band profile, as the peg component may have an outermost surface that is flush with the outermost surface of the adjustment strap, whereas a sliding keeper typically encircles the adjustment strap and would therefore add to the thickness of the assembled band in whatever location it is located. A fixed-position keeper may also reduce the possibility of the free end of the adjustment strap snagging on clothing or other items, as the fixed-position keeper will always anchor the same location in free end of the adjustment strap to the buckle strap, whereas a sliding keeper may allow for variation in the amount of the adjustment strap that extends beyond the keeper location. Adjustment straps with fixed-position keepers may be somewhat more difficult to insert through the buckle due, for example, to the peg component that may protrude out of some such implementations—the protruding portion of the peg component must also be threaded through the same buckle. However, in the event that the buckle were to accidentally unlatch, the peg component may also catch on the buckle and prevent the band from inadvertently falling off.

The present inventors identified two aspects of fixed-position keeper band designs that proved problematic. In a fixed-position keeper, the end of the adjustment strap is, in effect, pinned to the buckle strap (when worn) by the keeper, with the two straps overlapping each other between the keeper and the buckle. When such a band is worn by a wearer, the overlapping straps are necessarily flexed into a curved shape to allow the band to encircle the wearer's wrist or other limb. During such flexure, the buckle may attempt to slide relative to the adjustment strap due to the different radii of curvature that each strap experiences during flexure due to the thicknesses of both straps (this assumes that the straps are flexed into an arc-shaped curve, but similar behavior will occur for elliptical or other types of flexure).

There are two potential consequences from such flexure—one is that the adjustment strap may not lie flat against the buckle strap and may instead form a "bridge" between the keeper and the buckle because the buckle is prevented from sliding further away from the keeper along the adjustment strap due to engagement of the tang with a hole on the adjustment strap.

Figure 1:
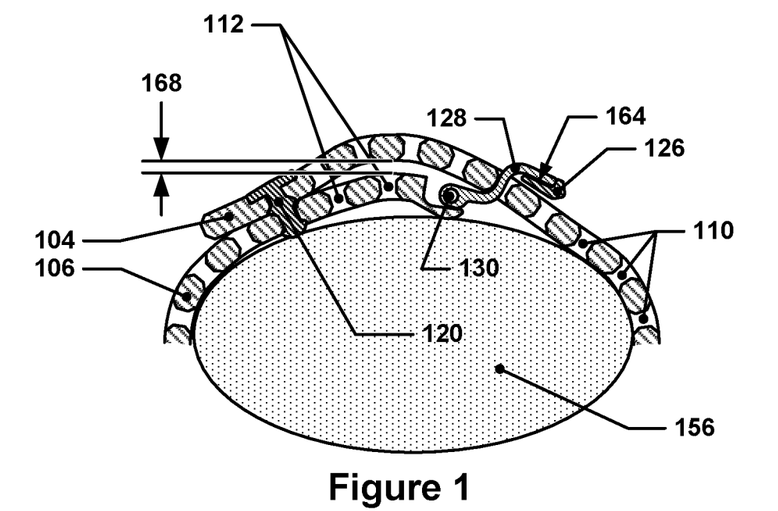
FIG. 1 illustrates an example band (only portions of the straps are shown) with a tang buckle and fixed-position keeper showing "bridging" behavior.

FIG. 1 illustrates an example band (only portions of the straps are shown) with a tang buckle and fixed-position keeper showing such "bridging" behavior. In FIG. 1, a buckle strap 106 is shown connected with an adjustment strap 104 by a buckle having a tang 128 and a frame 126. The tang 128 may pass through one of several adjustment holes 110, and a peg component 120 may pierce the adjustment strap 104 and be inserted into one of several keeper holes 112 in the buckle strap 106. The assembled band may encircle a person's wrist 156. During fastening, the tang 128 may be rotated about the tang pivot bar 130 and out of contact with the frame 126 before being inserted through one of the adjustment holes 110 and then rotated back down to contact the frame 126 at the tang contact surface 164. The peg component 120 may then be inserted into one of the keeper holes 112 to anchor the free end of the adjustment strap 104 in place relative to the buckle strap 106. Depending on the curvature of the straps and how tightly the band is worn on the wrist 156, the adjustment strap 104 may shift relative to the buckle strap 106, thereby potentially causing the adjustment strap to bridge upwards by distance 168, as shown in FIG. 1.

The other potential consequence is the opposite—the buckle may attempt to slide towards the keeper during flexure, which may cause the tang to be lifted up off of the buckle frame.

Figure 2:
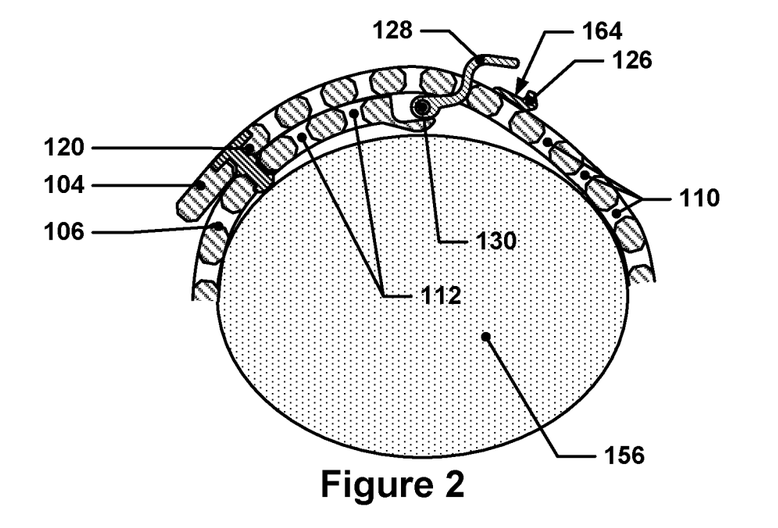
FIG. 2 depicts the same example band of FIG. 1 showing tang-lift behavior.

FIG. 2 depicts the same example band of FIG. 1, with similar components referenced using the same callouts. However, the wrist 156 in FIG. 2 is a different shape, causing the band to adopt a more circular appearance. As a result, the adjustment strap 104 may pull away from the frame 126, lifting the tang 128 off of the frame 126 and causing the tang 128 to not lie flat against the tang contact surface 164.

In either case, the result is not visually or aesthetically pleasing, and may increase the chances of the band snagging on clothing or otherwise catching on objects.

The present inventors conceived of a new type of tang buckle that includes a tang that includes an elongate or slotted hole through which a tang pivot bar is passed. This allows the tang to not only pivot about the tang pivot bar, but to also translate some distance in directions perpendicular to the center axis of the tang pivot bar. This translation capability allows the tang to shift positions in a direction generally aligned with the long axis of the buckle strap without rotating relative to the frame. Such sliding motion not only can prevent situations in which the tang lifts off of the frame due to strap flexure, but also situations in which the adjustment strap may "bridge." The tang 128 shown in both FIGS. 1 and 2 has a rotational pivot but does not have an elongate hole at the pivot point.

Figure 3:
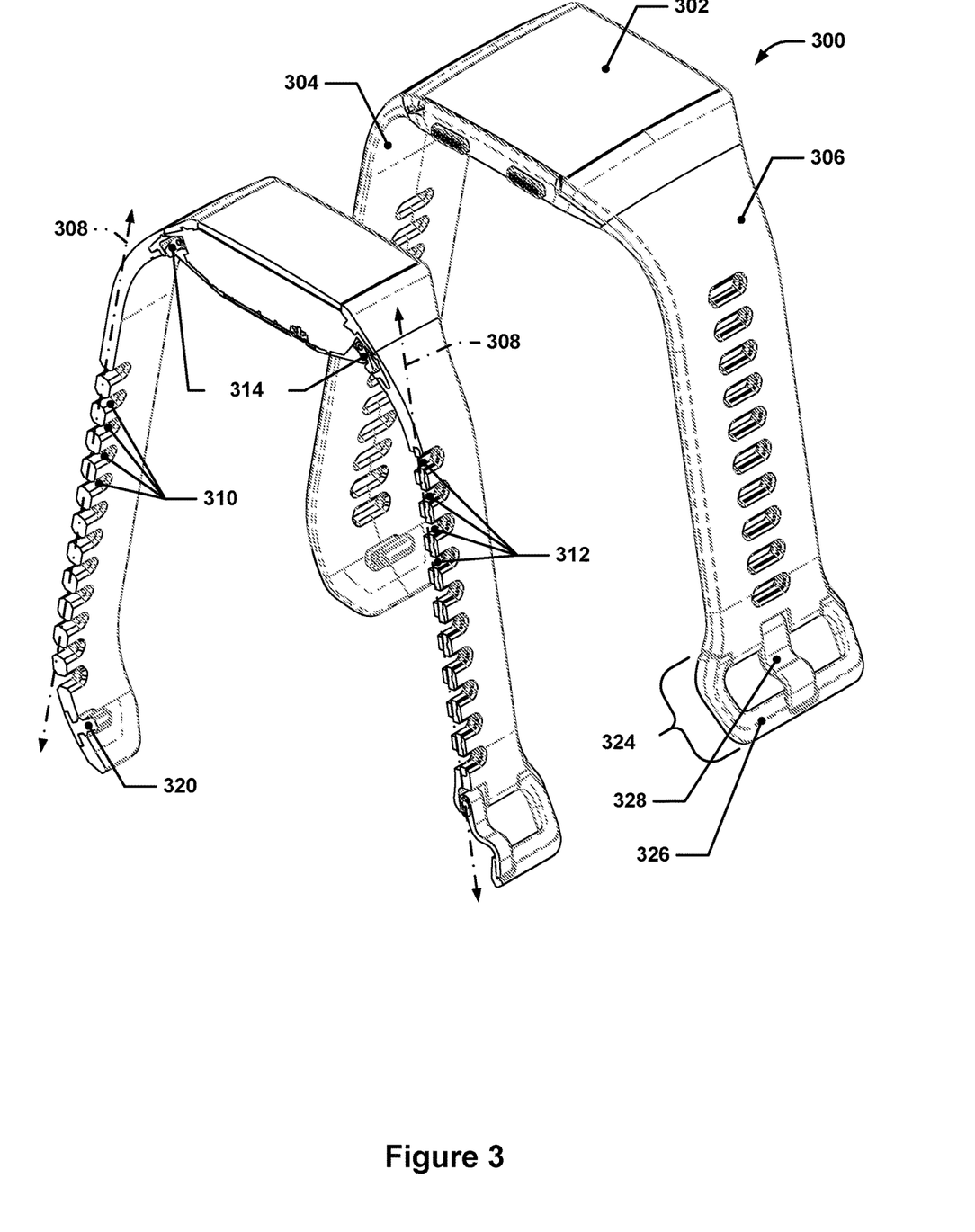
FIG. 3 depicts an isometric view and an isometric cutaway view of an example wrist-wearable device having a band with straps that use a tang with a slotted hole, as discussed above.
Figure 4:
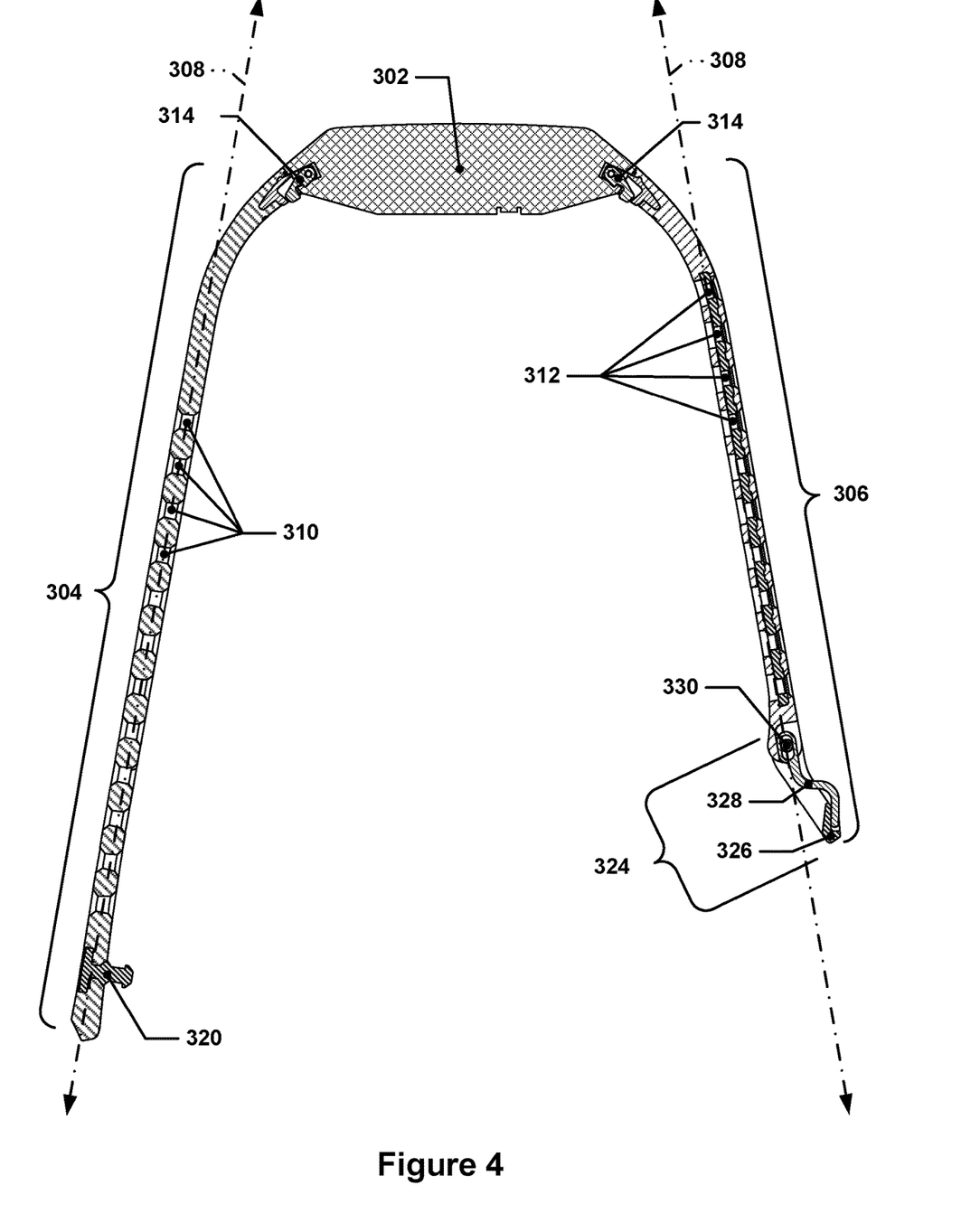
FIG. 4 depicts a side sectional view of the example wrist-wearable device from FIG. 3.

FIG. 3 depicts an isometric view and an isometric cut-away view of an example wrist-wearable device having a band with straps that use a tang with a slotted hole, as discussed above. FIG. 4 depicts a side sectional view of the example wrist-wearable device from FIG. 3.

In FIGS. 3 and 4, the example wrist-wearable device is fitness tracker 300, although the wrist-wearable device could be any device or even a wrist-wearable band that does not include any electronic components, e.g., a decorative band, identification band, etc.

The fitness tracker 300 may include a housing 302, a first strap 306 (also referred to herein as a "buckle strap") and a second strap 304 (also referred to herein as an "adjustment strap"). The housing 302 may be easily detachable from the first strap 306 and the second strap 304 using strap connectors 314, as in this example, or the straps may be permanently joined, e.g., via glue or co-molding, or detachable using special tools, e.g., similar to how many watch straps may be attached to or removed from a watch body.

The the first strap 306 and second strap 304 may each have a different long axis 308 associated with them. Each long axis 308 may represent the general long axis of the corresponding strap when the corresponding strap is laid flat, e.g., on a tabletop. It is to be understood that the long axis may also be thought of as adopting the curvature of the corresponding strap when that strap is flexed, e.g., strapped about a person's wrist. In such a flexed configuration, the long axis 308 will, of course, no longer be linear, and references to linear characteristics of the long axis 308 should be understood as also applying to the long axis 308 in the flexed state, although with reference to a linear axis that is tangent to the flexed long axis 308 at the location of interest. For example, if a surface is "parallel" to the long axis at a particular location, then that surface would be parallel to an axis that is tangential to the flexed long axis 308 at that location.

As can be seen, the adjustment strap 304 has a linear array of adjustment holes 310 that are arranged along the long axis 308 of the adjustment strap 304, whereas the buckle strap 306 has a linear array of keeper holes 312 that are arranged along the long axis 308 of the buckle strap 306. The adjustment strap 304 also includes a peg component 320 (which may also be referred to as a "keeper" or a "fixed-position keeper") that may be inserted into one of the keeper holes 312 to anchor the free end of the adjustment strap 304 to the buckle strap 306. Similarly, the buckle strap 306 also includes a buckle 324 that may have a tang 328 and a frame 326; the tang 328 may be inserted through one of the adjustment holes 310 in the adjustment strap 304 to anchor the buckle 324 to the adjustment strap 304. In some implementations, the adjustment strap 304 may include a pre-molded curvature in the free end with the peg component 320, as is shown in FIG. 3 (in FIG. 4, this portion has been flattened out to align with the long axis 308 of the adjustment strap). The pre-molded curvature may cause the free end of the adjustment strap 304 that protrudes beyond the peg component 320 to lie flush against the buckle strap 306 when fastened.

Figure 5:
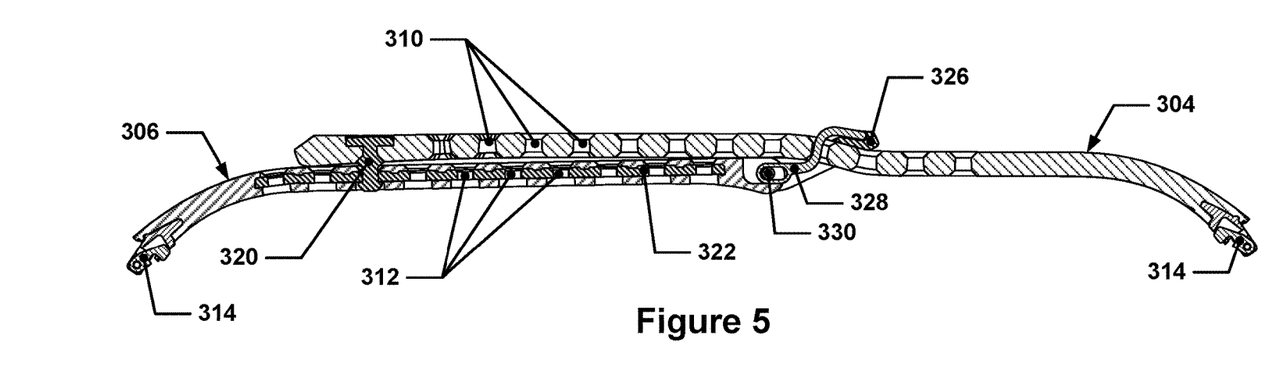
FIG. 5 depicts a side section view of the straps from the example wrist-wearable device from FIG. 3 in a connected configuration (with the housing removed and the straps laid flat, however).
Figure 6:
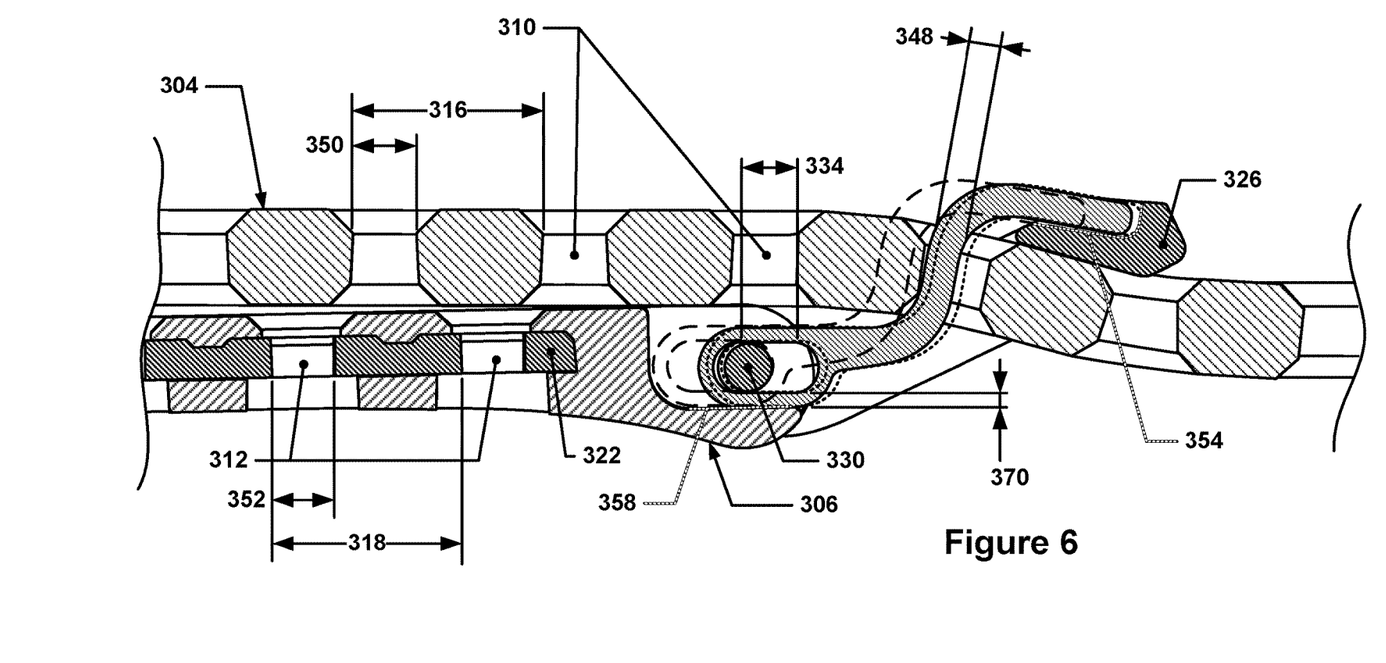
FIG. 6 depicts a detail view of the buckle portion of the assembled straps.
Figure 7:
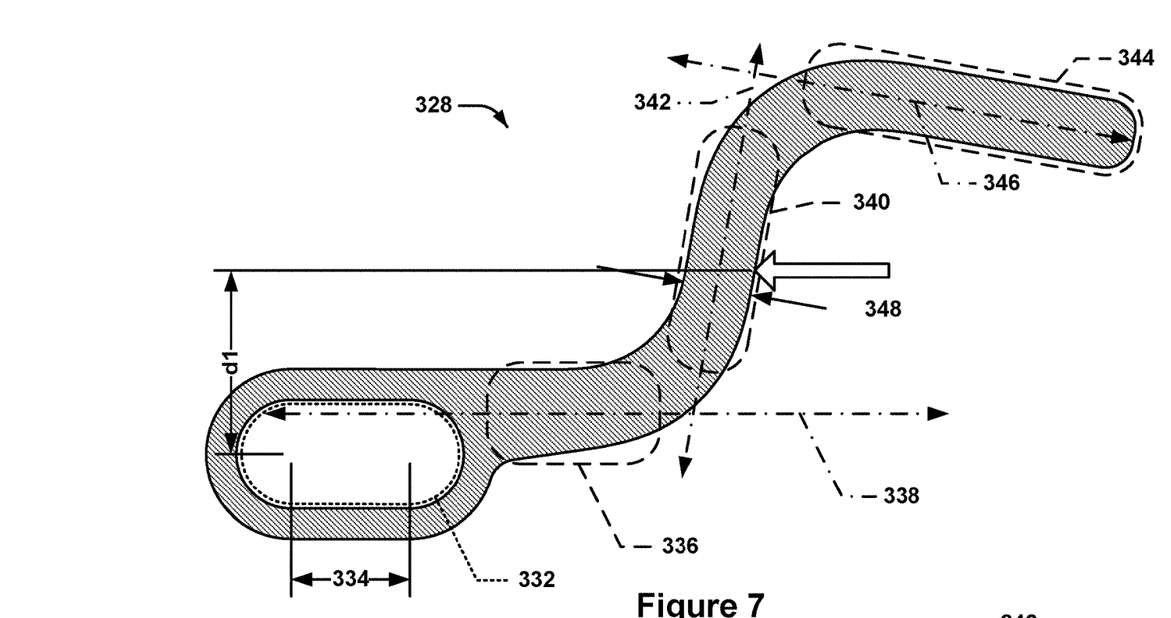
FIG. 7 depicts a detail view of an example tang with an elongate hole.

FIG. 5 depicts a side section view of the straps from the example wrist-wearable device from FIG. 3 in a connected configuration (with the housing removed and the straps laid flat, however). FIG. 6 depicts a detail view of the buckle portion of the assembled straps. FIG. 7 depicts a detail view of the tang 328.

As can be seen in FIGS. 5, 6 and 7, the tang 328 may have an elongate hole 332 (see FIG. 7) that is sized to allow a tang pivot bar 330 to be passed through the elongate hole 332. The elongate hole 332 may have a long axis that allows the tang 328 to translate in a direction perpendicular to the tang pivot bar 330 center axis by a first distance 334 (the first distance 334 being greater than any natural slop between the tang pivot bar 330 and the tang 328, e.g., as may result from the accommodation of machining tolerances for the tang pivot bar 330 and/or the tang 328). Thus, the tang 328 may both pivot about the tang pivot bar 330 and translate relative to the tang pivot bar 330 along a direction perpendicular to the axis about which the tang 328 may rotate. In the depicted example, the elongate hole 332 has an obround cross-section with the center points of the semicircular endcaps separated by the first distance 334, although other cross-sections may be used as well, e.g., rectangular cross-section holes.

As can be seen in FIG. 6, the adjustment holes 310 in the adjustment strap 304 may each have an adjustment hole width 350 along the long axis 308 of the adjustment strap 304 (not shown; see FIG. 3 or 4) and may each be spaced apart from adjacent adjustment holes 310 along that long axis 308 by an adjustment hole pitch 316. Similarly, the keeper holes 312 of the buckle strap 306 may each have a keeper hole width 352 along the long axis 308 of the buckle strap 306 and may each be spaced apart from adjacent keeper holes 312 along that long axis 308 by a keeper hole pitch 318. The keeper hole width 352 may generally be sized to be similar to the width of the peg component 320 (when installed in the adjustment strap 304) along the long axis 308 of the adjustment strap 304. In some implementations, the keeper hole width 352 may be sized slightly smaller than the width of the peg component 320 so that the peg component 320 must slightly deform whatever keeper hole 312 it is inserted into when fully inserted; this may snugly retain the peg component 320 and prevent the peg component 320 from rattling or otherwise being loose. In some implementations, the buckle strap 306 may be made of a flexible polymeric material, e.g., elastomeric polyurethane, that is co-molded with a flexible spine 322 that is made of a stiffer material than the flexible polymeric material (to be clear, both the spine 322 and the portion of the strap surrounding the spine may be made of flexible polymeric materials, but the flexible polymeric material of the spine 322 may be stiffer and stronger than the material surrounding it, thereby protecting the softer material from potential damage due to insertion/removal of the peg component into/from the keeper holes 312).

While the depicted example features an adjustment hole pitch 316 and a keeper hole pitch 318 that are both constant and equal to one another, other implementations may feature an adjustment hole pitch 316 and/or a keeper hole pitch 318 that are variable, e.g., the pitch spacing between each successive pair of keeper holes 312 and/or adjustment holes 310 may be increased or decreased, depending on the desired degree of adjustment permitted for each circumferential size setting of the band. In a traditional tang buckle with a non-translating tang.

In some implementations, the buckle strap 306 may include a guide surface 358 that may be positioned so as to resist or limit rotational movement of the tang 328 about the tang pivot bar 330 when the tang 328 is in at least some translated positions relative to the tang pivot bar 330. For example, in FIG. 6, the portion of the tang 328 between the guide surface 358 and the tang pivot bar 330 may have a thickness that is between about 80% and 100% of a second distance 370 between the guide surface 358 and the tang pivot bar 330. When the tang 328 is slid all the way to the left (see dashed outline of the tang 328) in FIG. 6 (and in many other positions as well), the left-most portion of the tang 328 may be prevented from rotating downwards (such limits on rotational movement will, of course, be subject to allowance for rotational movements that may be accommodated by, for example, small tolerance gaps or other small movements that may occur before the left-most portion of the tang 328 actually contacts the guide surface 358) about the tang pivot bar 330 due to the presence of the guide surface 358. In contrast, when the tang 328 is slid all the way to the right (see dotted outline of tang 328) in FIG. 6, the tang 328 may be free to rotate upwards (counterclockwise in FIG. 6) from the position shown. Such an arrangement may act to resist attempts by the tang 328 to lift off from the frame 326 when the portion of the adjustment strap 304 through which the tang 328 is inserted moves closer to the peg component 320. In some implementations, the guide surface 358 may extend along a direction parallel to the long axis of the buckle strap 306 by a distance that is at least as long as the first distance 334.

When the tang 328 is in a closed position (as shown in FIG. 6), the tang 328 may rest on a tang contact surface 354 of the frame 326. In some implementations, such as the one depicted in FIG. 6, the tang contact surface 354 may be sloped relative to the long axis 308 of the buckle strap 306 such that translation of the tang 328 away from the frame 326 (to the left in FIG. 6) may cause the tang 328 to attempt to rotate upwards (counterclockwise in FIG. 6) about the tang pivot bar 330 by a small amount. As discussed above, however, such rotational movement of the tang 328 may be prevented by the guide surface 358. The end result in such configurations may be that a slight amount of rotation of the tang 328 may be permitted due to compliance in the components involved, but such rotation will cause whatever slop is present in the components to be removed while in such a configuration. As such, the tang 328 will be compressed against the tang contact surface 354 with more force the further the tang 328 moves from the frame 326, thereby helping to ensure that the tang 328 does not lift off of the frame 326. The amount of slope to the tang contact surface 354 relative to the long axis 308 of the buckle strap 306 and/or to the guide surface 358 may be on the order of 10° (sloping upwards such that the end of the tang contact surface 354 that is closest to the tang pivot bar 330 is further from the long axis 308 of the buckle strap 306 than the end of the tang contact surface 354 that is furthest from the tang pivot bar 330).

Figure 8:
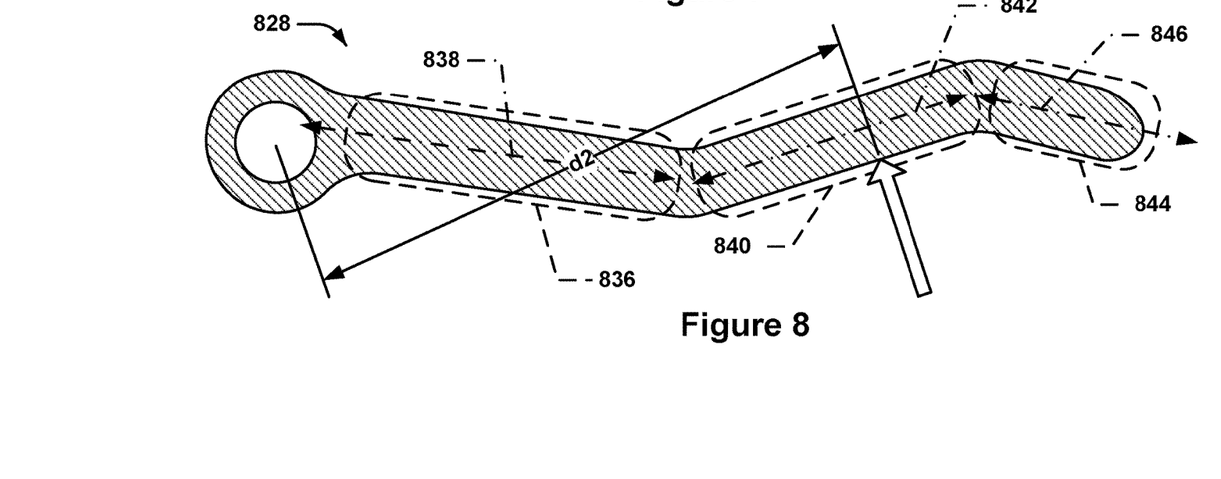
FIG. 8 depicts an example of a traditional tang.

A further characteristic of the tang 328 that may be present in some implementations, such as the one depicted in FIG. 7, is that the tang 328 may follow a more sharply angled path than is followed by traditional tangs. In a traditional tang (an example of which is shown in FIG. 8), the tang 828 may follow a relatively shallow path, e.g., a path in which each segment 836, 840, and 844 follows a respective axis 838, 842, and 846 that forms a small acute angle, e.g., less than or equal to about ~30°, relative to the adjoining axis or axes. Such shallow paths allow the traditional tang to be more easily inserted through the adjustment holes in the adjustment strap.

As can be seen in FIG. 7, the tang 328 follows a much more exaggerated path, with a first segment 336, a second segment 340, and a third segment 344 that follow a respective first axis 338, second axis 342, and third axis 346. As can be seen the acute angles formed between the first axis 338/second axis 342 and the second axis 342/third axis 346 are much larger than in a traditional tang, and may, in some circumstances, even be inclusive of 90° (which is technically not an acute angle). Such acute angles, for example, may be in the range of 70° to 90°. In such implementations, the second segment 340 that passes through the adjustment strap 304 may, by virtue of such angular relationships, be nearly perpendicular to the adjustment strap 304 in the immediate vicinity of where the tang 328 passes through the adjustment strap 304. As a result of this and the tang thickness 348 being less than the adjustment hole width 350, there may be increased clearance between the tang 328 and the adjustment hole 310 (see FIG. 7) that may allow for more relative movement between that portion of the adjustment strap 304 and the buckle strap 306 before the sides of the adjustment hole 310 through which the tang 328 is inserted actually come into contact with and push on the tang 328.

Moreover, when enough movement occurs between the adjustment strap 304 and the buckle strap 306 to result in contact between the second segment 340 of the tang 328 and the sides of the adjustment hole 310, the resulting load on the tang 328 will be concentrated along a direction generally parallel to the long axis 308 of the buckle strap 306 and/or the guide surface 358. This may concentrate the loading on the tang 328 along the translation direction permitted by the elongate hole 332, causing the tang 328 to preferentially translate rather than rotate about the center axis of the tang pivot bar 330. In conventional tang arrangements, such loading may primarily be in a direction that is perpendicular or oblique to the long axis 308 of the buckle strap 306. For example, in FIG. 7, a load applied to the tang 328 in the direction indicated by the white arrow would create a torque based on the distance d1 (assuming that the tang 328 was not free to slide or translate and could only rotate—this, of course, is not the case except when the tang is in the leftmost translation position in FIG. 7). The same load applied to a conventional tang would result in a torque based on the distance d2, i.e., the resulting torque would be nearly three times larger for the same load simply due to the path followed by the tang and would therefore be more likely to cause undesired rotation of the tang.

Figure 9:
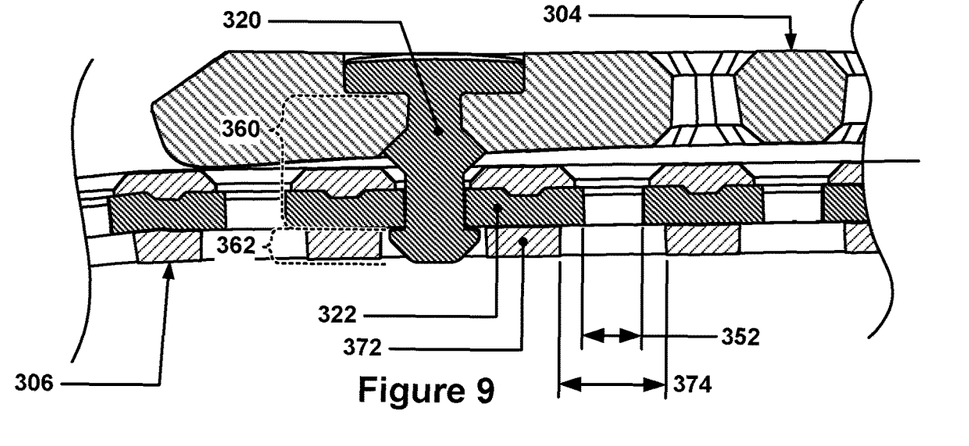
FIG. 9 depicts a detail sectional view of a portion of the straps with the peg component visible.

FIG. 9 depicts a detail sectional view of a portion of the straps with the peg component visible. As can be seen, the peg component 320 has a head portion 362 and a body portion 360; the body portion 360 may be sized to have generally the same cross-sectional area as a corresponding receiving hole in the adjustment strap 304, thus allowing the peg component 320 to be inserted into the adjustment strap 304. The body portion 360 may protrude through the adjustment strap 304 such that the body portion 360 may also be inserted into one of the keeper holes 312 in the buckle strap 306. The head portion 362 may be sized larger in cross-section than the body portion 360 so as to resist being pulled out of the keeper hole 312 into which it is inserted. In some implementations, the bottom edge or surface (or uppermost, in the orientation of FIG. 9) of the head portion 362 may be flush with the spine 322 when fully inserted, thereby causing any pull-out load on the peg component 320 to be applied to the spine rather than onto the outer skin 372. The outer skin 372 may have openings with a width 374 that is sized larger than the head portion 362 so that the head portion 362 does not significantly load the outer skin 372 directly.

Figure 10:
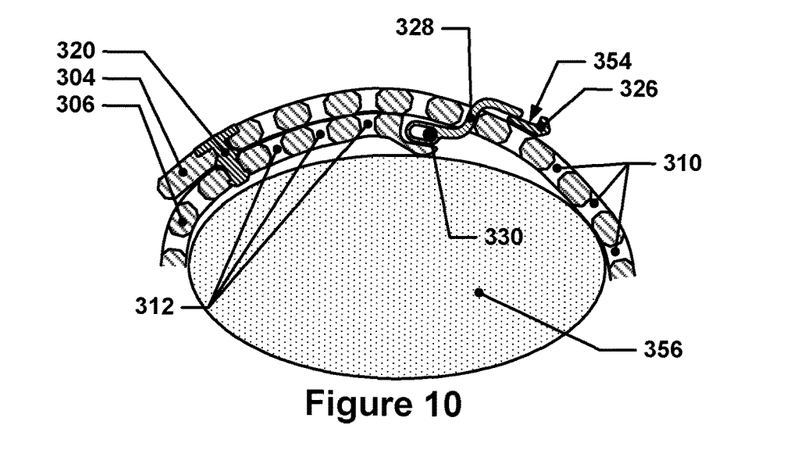
FIGS. 10 and 11 depict how the translation capability of a tang having an elongate hole may act to accommodate relative movement between an adjustment strap and a buckle.
Figure 11:
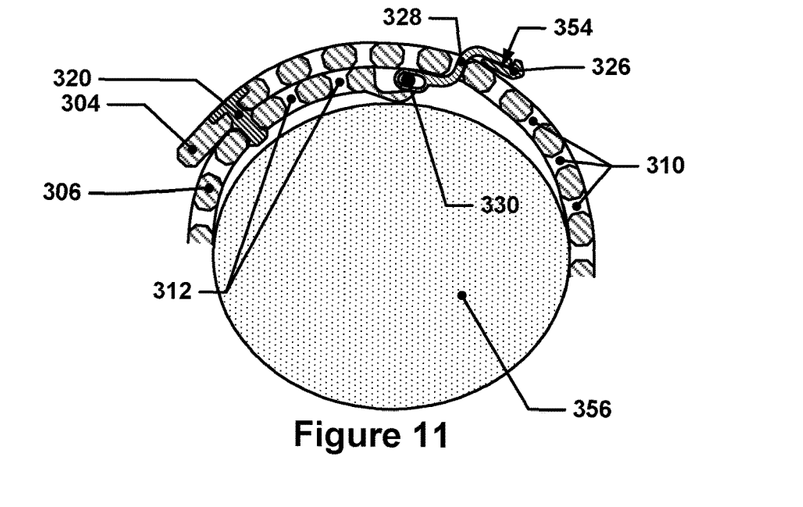

FIGS. 10 and 11 depict how the translation capability of a tang having an elongate hole may act to accommodate relative movement between the adjustment strap 304 and the buckle 324. In both FIGS. 10 and 11, the tang 328 has been inserted through the fifth adjustment hole 310 from the peg component 320 in the adjustment strap 304. However, due to the different curvatures of the wrists 356 in each Figure, the resulting flexure of the straps needed in order to cause the band to conform to each wrist shape results in different relative positioning of the peg component 320 of the buckle strap 306 relative to the buckle strap 306. As a result, the peg component 320 is inserted into a different keeper hole 312 in each of FIGS. 10 and 11, and the alignment between the adjustment holes 310 and the tang 328 is significantly different. In FIG. 10, the tang 328 is slid towards the tang pivot bar 330 (to the left, in FIG. 10) to the furthest extent possible—as can be seen, this allows the tang 328 to be fully engaged with the adjustment strap 304 and still lie flat against the tang contact surface 354 of the frame 326. In FIG. 11, the tang is slid to the right (not to the furthest extent possible, but over halfway) to allow the tang 328 to pass through the adjustment strap and also lie flat against the tang contact surface 354. Thus, both wrist curvatures may be accommodated by the fixed-position keeper band without producing tang lift or strap bridging side effects.

In some implementations, the first distance 334 may be a function of tang thickness 348, adjustment hole width 350, and adjustment hole pitch 316. For example, the first distance may be determined according to the relationship:

$$d_1 = t - w + r \cdot p$$

where $d_1$=the first distance 334, t=tang thickness 348, p=adjustment hole pitch 316, and r=a constant between 0.4 and 0.5. Implementations with a first distance 334 determined according to the above relationship may provide for sufficient tang translation to accommodate most or all anticipated use cases for a variety of different wrist sizes and shapes.

Figure 12:
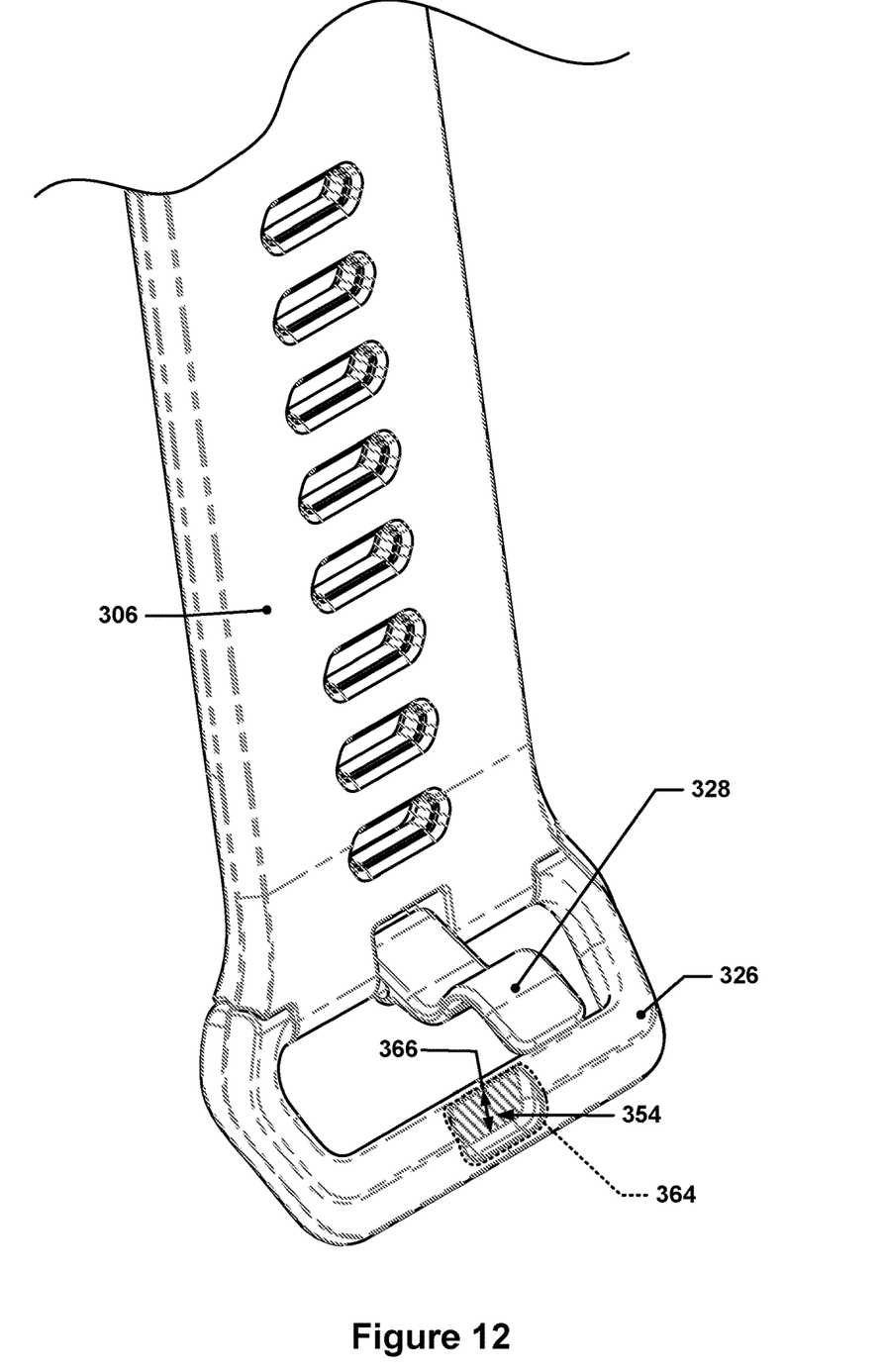
FIG. 12 depicts a detail view of the buckle end of a buckle strap with the tang raised.

FIG. 12 depicts a detail view of the buckle end of the buckle strap 306 with the tang 328 raised. As can be seen, the frame 326 includes a recess 364 that provides the tang contact surface 354 that may have a contact surface length 366 that is at least as long as the first distance 334, thereby allowing the tang to slide along the tang contact surface 354 for the entire translational range of movement for the tang 328 without disengaging with the frame 326.

It is to be understood that the above disclosure, while focusing on a particular example implementation or implementations, is not limited to only the discussed example, but may also apply to similar variants and mechanisms as well, and such similar variants and mechanisms are also considered to be within the scope of this disclosure.

What is claimed is:

1. An apparatus comprising:
   a first strap, the first strap having a plurality of keeper holes arranged at spaced-apart locations from one another along a long axis of the first strap; and
   a buckle, the buckle located at one end of the first strap and including:
   a tang pivot bar;

a tang, the tang having an elongate hole through which the tang pivot bar passes, wherein the elongate hole allows the tang to rotate about a center axis of the tang pivot bar and to translate relative to the tang pivot bar by at least a first distance along a direction perpendicular to the center axis; and a frame, wherein the frame includes a contact surface configured to contact, regardless of where the tang pivot bar is positioned in the elongate hole, a portion of the tang located on an end of the tang opposite from the elongate hole when the tang is rotated relative to the frame so as to engage with the contact surface.

2. The apparatus of claim 1, wherein the elongate hole is an obround hole and the tang pivot bar has a round cross section in at least a region that passes through the tang.

3. The apparatus of claim 1, further comprising:
a second strap, the second strap having a plurality of adjustment holes arranged at spaced-apart locations from one another along a long axis of the second strap.

4. The apparatus of claim 3, wherein:
t=thickness of the tang where the tang passes through one of the adjustment holes on the second strap when the second strap is connected with the first strap,
w=width of the adjustment hole in a direction aligned with the long axis of the second strap,
p=pitch distance between adjacent adjustment holes,
r is a value between 0.4 and 0.5, and
the first distance=t−w+rp.

5. The apparatus of claim 3, further comprising a peg component that extends from a side of the second strap that faces towards the first strap when the second strap and the first strap are connected, wherein the peg component is configured to engage with one of the keeper holes on the first strap.

6. The apparatus of claim 5, wherein the peg component includes a body portion with a cross-section that is substantially the same as cross-sections of the keeper holes and a head portion that has a cross-section larger than the cross-sections of the keeper holes.

7. The apparatus of claim 6, wherein:
the first strap includes a flexible polymer outer skin and a flexible polymer spine embedded within the outer skin,
the spine includes the keeper holes, and
the outer skin has openings with cross-sections larger than the cross-sections of the head portion at each keeper hole such that the head portion is at least partially recessed into the first strap when the peg component is engaged with the spine.

8. The apparatus of claim 3, wherein the adjustment holes have a pitch spacing of between 0.2 inches and 0.25 inches.

9. The apparatus of claim 3, wherein the adjustment holes have a pitch spacing that is variable.

10. The apparatus of claim 3, wherein the adjustment holes have a pitch spacing that is constant.

11. The apparatus of claim 1, wherein the tang includes:
a first segment that extends away from the elongate hole along a first axis aligned with a long axis of the elongate hole,
a second segment that extends along a second axis that intersects the first axis at an angle of between 70° and 90°, and
a third segment that extends along a third axis that intersects the second axis at an angle of between 70° and 90°.

12. The apparatus of claim 1, wherein the first strap is configured to permit the tang to rotate about the center axis of the tang pivot bar by a first amount when the tang is translated in the direction perpendicular to the center axis such that the tang is extended away from the keeper holes by the first distance.

13. The apparatus of claim 12, wherein:
the first strap includes a guide surface that is nominally parallel to the long axis of the first strap, and
the guide surface has a dimension along a direction parallel to the long axis of the first strap that is at least twice the first distance.

14. The apparatus of claim 13, wherein:
the guide surface is configured to permit the tang to rotate about the center axis of the tang pivot bar by a second amount when the tang is translated in the direction perpendicular to the center axis such that the tang is translated towards the keeper holes by the first distance, and
the second amount is less than the first amount.

15. The apparatus of claim 13, wherein a portion of the tang in between the tang pivot bar and the guide surface has a thickness that is between 80% and 100% of a minimum distance between the tang pivot bar and the guide surface in a region where the tang engages with the tang pivot bar.

16. The apparatus of claim 1, wherein the frame has a recess and:
the recess is configured to receive the tang when the tang is rotated around the center axis of the tang pivot bar and into contact with the frame,
the recess is sized wider than the tang,
the recess has the contact surface that contacts the tang when the tang and the frame are in contact with each other, and
the contact surface is longer than the first distance in a direction aligned with the long axis of the first strap when the frame is oriented such that the contact surface is parallel to the long axis of the first strap.

17. The apparatus of claim 1, wherein the keeper holes have a pitch spacing of between 0.2 inches and 0.25 inches.

18. An apparatus comprising:
strap means; and
buckle means connected with the strap means and including slidable and rotatable tang means and a frame, wherein the tang means is rotatable relative to the frame about a center axis and translatable by at least a first distance relative to the frame along a direction perpendicular to the center axis, wherein the slidable and rotatable tang means is configured such that an end of the slidable and rotatable tang means opposite the center axis is able to be rotated into contact with the frame regardless of an amount of translation experienced by the slidable and rotatable tang means.

19. A method for reducing bridging in a wearable device strap, the method comprising:
providing a first strap, the first strap having a plurality of keeper holes arranged at spaced-apart locations from one another along a long axis of the first strap and a buckle, the buckle located at one end of the first strap and including:
a tang pivot bar;
a tang, the tang having an elongate hole through which the tang pivot bar passes, wherein the elongate hole allows the tang to rotate about a center axis of the tang pivot bar and to translate relative to the tang pivot bar by at least a first distance along a direction perpendicular to the center axis; and
a frame, wherein the frame includes a contact surface configured to contact, regardless of where the tang pivot bar is positioned in the elongate hole, a portion of the tang located on an end of the tang opposite from the elongate hole when the tang is rotated relative to the frame so as to engage with the contact surface.

20. The method of claim 19, further comprising:

providing a second strap, the second strap having a plurality of adjustment holes arranged at spaced-apart locations from one another along a long axis of the second strap;

inserting a first end of the second strap through the buckle;

inserting the tang through one of the adjustment holes;

connecting the first end of the second strap with one of the keeper holes in the first strap; and sliding the tang relative to the tang pivot bar until the tang rests against the frame and the second strap lies flush against the first strap.

\* \* \* \* \*